(12) United States Patent
Kandukuri Narayan

(10) Patent No.: US 8,203,998 B2
(45) Date of Patent: Jun. 19, 2012

(54) SYSTEM AND METHODS FOR CANCELLING INTERFERENCE IN A COMMUNICATION SYSTEM

(75) Inventor: Sunil K. Kandukuri Narayan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 12/409,247

(22) Filed: Mar. 23, 2009

(65) Prior Publication Data

US 2009/0245082 A1    Oct. 1, 2009

Related U.S. Application Data

(60) Provisional application No. 61/040,578, filed on Mar. 28, 2008.

(51) Int. Cl.
 *H04W 4/00*    (2009.01)
(52) U.S. Cl. ........................................ 370/328; 455/501
(58) Field of Classification Search .......... 370/328–334; 455/63.1, 67.13
 See application file for complete search history.

(56) References Cited

U.S. PATENT DOCUMENTS

| 5,933,768 | A  | * | 8/1999  | Skold et al. ................... 455/296 |
| 6,832,073 | B2 | * | 12/2004 | Jang et al. ................... 455/67.13 |
| 6,947,748 | B2 | * | 9/2005  | Li et al. .......................... 455/450 |
| 7,016,653 | B2 | * | 3/2006  | Tsunehara et al. .............. 455/69 |
| 7,151,755 | B2 | * | 12/2006 | Xu ................................ 370/330 |
| 7,310,531 | B2 | * | 12/2007 | Uchida ......................... 455/450 |
| 7,453,912 | B2 | * | 11/2008 | Laroia et al. ................. 370/526 |
| 7,474,692 | B2 | * | 1/2009  | Ogawa et al. ................. 375/148 |
| 7,519,395 | B2 | * | 4/2009  | Mesecher et al. ............. 455/561 |
| 7,558,544 | B2 | * | 7/2009  | Kim et al. ..................... 455/132 |
| 7,616,595 | B2 | * | 11/2009 | Classon et al. ................ 370/319 |
| 7,620,370 | B2 | * | 11/2009 | Barak et al. ................. 455/67.13 |
| 7,680,458 | B2 | * | 3/2010  | Lim et al. ..................... 455/63.1 |
| 7,697,595 | B2 | * | 4/2010  | Nagarajan et al. ............ 375/148 |
| 7,706,352 | B2 | * | 4/2010  | Rinne et al. .................. 370/350 |
| 7,751,817 | B2 | * | 7/2010  | Kim et al. ..................... 455/434 |

(Continued)

FOREIGN PATENT DOCUMENTS

EP    1802000 A1    6/2007

(Continued)

OTHER PUBLICATIONS

International Search Report & Written Opinion—PCT/US09/038147 International Search Authority—European Patent Office—Sep. 23, 2009.

*Primary Examiner* — Ricky Ngo
*Assistant Examiner* — Ben H Liu
(74) *Attorney, Agent, or Firm* — Larry Moskowitz; Abdollah Katbab

(57) ABSTRACT

Systems and methods for canceling interference in a communication system are described. A signal that comprises current data from a current access point and secondary data from one or more secondary access points is received. The secondary data is demodulated using one or more secondary channel estimates if a signal metric is less than a predetermined threshold. Interference in the received signal is canceled using the demodulated secondary data if the signal metric is less than the predetermined threshold. The received signal with the interference canceled is demodulated using a current channel estimate to obtain the current data. The method for interference cancellation may use the same hardware resources and processing available for receiving data from a single access point.

28 Claims, 12 Drawing Sheets

U.S. PATENT DOCUMENTS

| | | | |
|---|---|---|---|
| 7,773,705 B2* | 8/2010 | Jung et al. | 375/347 |
| 7,778,309 B2* | 8/2010 | Jung et al. | 375/148 |
| 7,804,797 B2* | 9/2010 | Mori et al. | 370/318 |
| 2003/0128787 A1* | 7/2003 | Terasawa et al. | 375/367 |
| 2004/0081121 A1* | 4/2004 | Xu | 370/329 |
| 2004/0116122 A1* | 6/2004 | Zeira et al. | 455/445 |
| 2005/0111408 A1* | 5/2005 | Skillermark et al. | 370/331 |
| 2006/0084390 A1* | 4/2006 | Salonaho et al. | 455/67.11 |
| 2006/0094363 A1* | 5/2006 | Kang et al. | 455/63.1 |
| 2006/0229075 A1* | 10/2006 | Kim et al. | 455/436 |
| 2007/0002743 A1* | 1/2007 | Fan | 370/235 |
| 2007/0081449 A1* | 4/2007 | Khan | 370/208 |
| 2007/0110003 A1* | 5/2007 | Tujkovic et al. | 370/335 |
| 2007/0147538 A1* | 6/2007 | Jung et al. | 375/267 |
| 2007/0149242 A1* | 6/2007 | Kim et al. | 455/525 |
| 2007/0161361 A1* | 7/2007 | Vaisanen et al. | 455/302 |
| 2007/0248046 A1* | 10/2007 | Khan | 370/329 |
| 2008/0014958 A1* | 1/2008 | Kim et al. | 455/452.2 |
| 2008/0108363 A1* | 5/2008 | Yu et al. | 455/450 |
| 2008/0117872 A1* | 5/2008 | Kim et al. | 370/329 |
| 2008/0175197 A1* | 7/2008 | Shao et al. | 370/329 |
| 2009/0185521 A1* | 7/2009 | Li et al. | 370/315 |
| 2009/0207803 A1* | 8/2009 | Kawamura et al. | 370/330 |
| 2009/0225721 A1* | 9/2009 | Cudak et al. | 370/330 |
| 2009/0247086 A1* | 10/2009 | Lin et al. | 455/67.11 |
| 2010/0027494 A1* | 2/2010 | Kwon et al. | 370/329 |
| 2010/0075703 A1* | 3/2010 | Imai et al. | 455/501 |

FOREIGN PATENT DOCUMENTS

WO    WO 2007063438 A2 *    6/2007

* cited by examiner

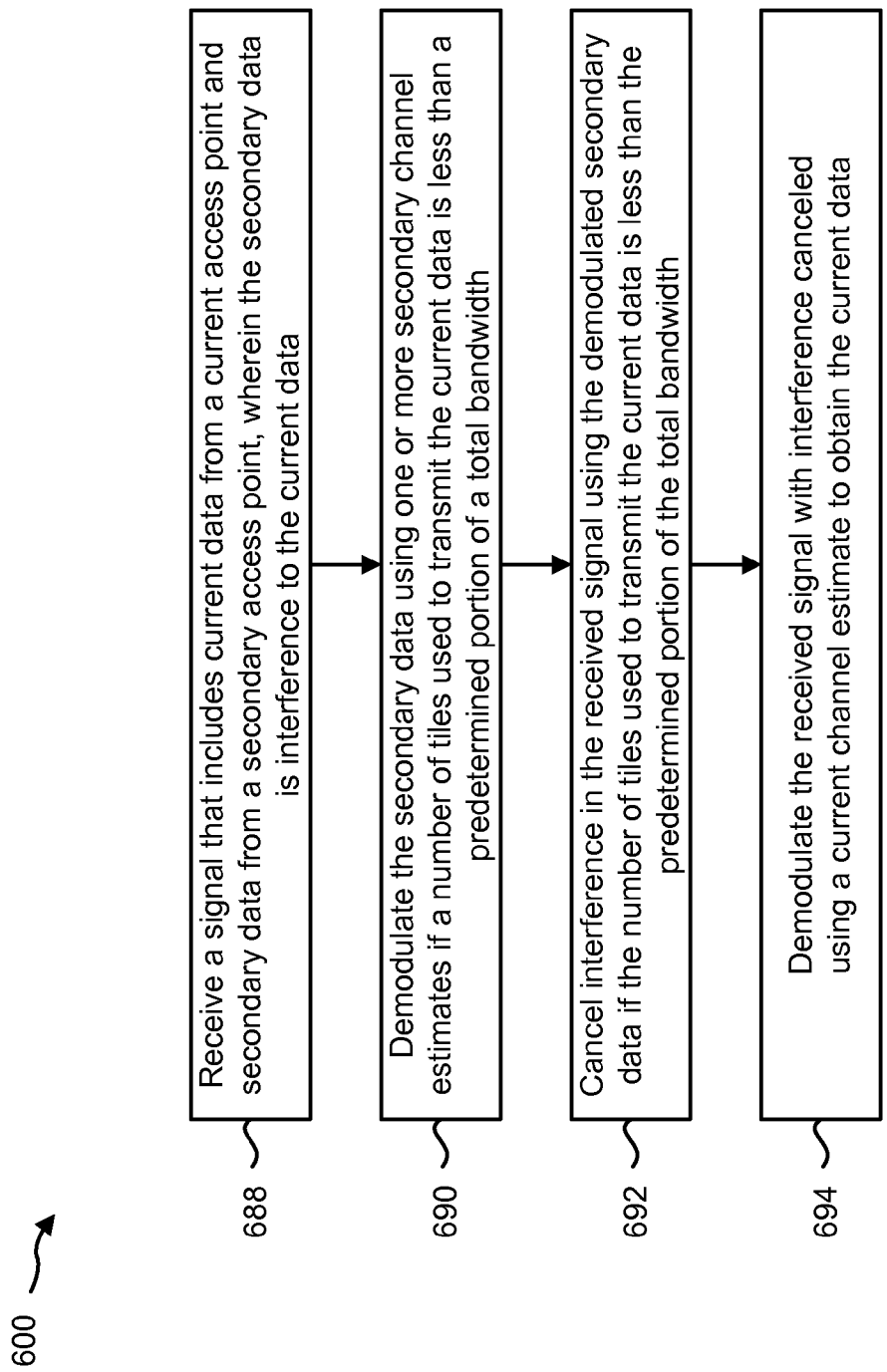

SYSTEM AND METHODS FOR CANCELLING INTERFERENCE IN A COMMUNICATION SYSTEM

RELATED APPLICATIONS

This application is related to and claims priority from U.S. Provisional Patent Application Ser. No. 61/040,578, filed Mar. 28, 2008, for "Method for Interference Cancellation," with inventor Sunil Kandukuri, which is incorporated herein by reference.

TECHNICAL FIELD

The present disclosure relates to communication systems. Specifically, the present disclosure relates to canceling interference in a communication system.

BACKGROUND

Wireless communication systems have become an important means by which many people worldwide have come to communicate. A wireless communication system may provide communication for a number of mobile stations, each of which may be serviced by a base station. As used herein, the term "mobile station" refers to an electronic device that may be used for voice and/or data communication over a wireless communication system. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, a mobile device, a wireless device, user equipment, or some other similar terminology. The term "base station" refers to a wireless communication station that is installed at a fixed location and used to communicate with mobile stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

BRIEF DESCRIPTION OF THE DRAWINGS

FIG. 6 is a flow diagram illustrating a method for canceling interference in a wireless communication network;

DETAILED DESCRIPTION

Figure 1:
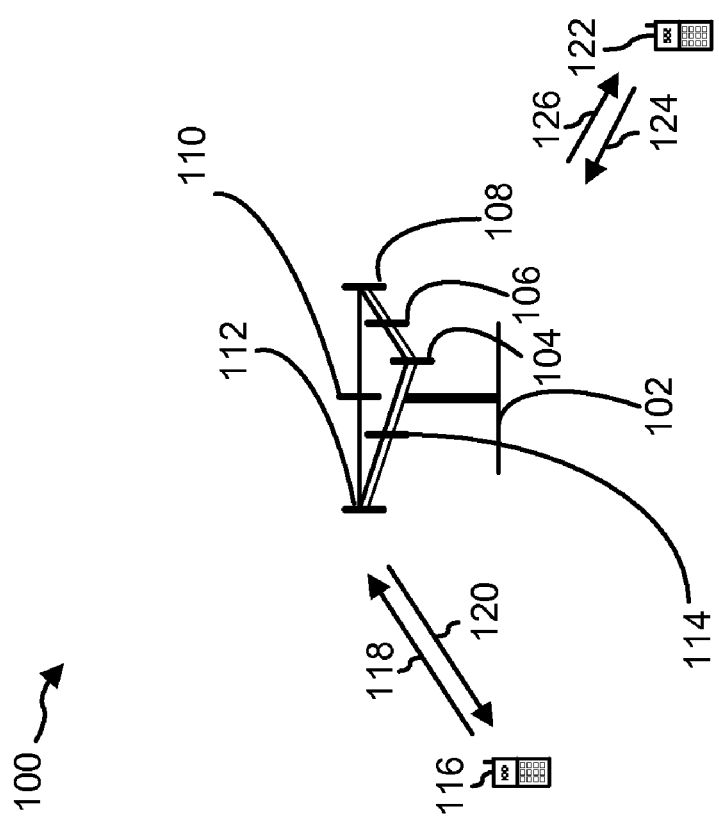
FIG. 1 is a block diagram illustrating a wireless communication system in which the methods disclosed herein may be utilized.

A method for canceling interference in a communication system is disclosed. A signal that includes current data from a current access point and secondary data from one or more secondary access points is received. The secondary data becomes interference for the current data if they both occupy the same bandwidth. The secondary data is demodulated using one or more secondary channel estimates if a signal metric is less than a predetermined threshold. Interference in the received signal is canceled using the demodulated secondary data if the signal metric is less than the predetermined threshold. The received signal with the interference canceled is demodulated using a current channel estimate to obtain the current data. The present systems and methods for interference cancellation may use the same hardware resources and processing available for receiving data from a single access point.

An apparatus for canceling interference in a communication system is also disclosed. The apparatus includes a processor and memory in electronic communication with the processor. Executable instructions are stored in the memory. The instructions are executable to receive a signal that includes current data from a current access point and secondary data from one or more secondary access points. The instructions are also executable to demodulate the secondary data using one or more secondary channel estimates if a signal metric is less than a predetermined threshold. The instructions are also executable to cancel interference in the received signal using the demodulated secondary data if the signal metric is less than the predetermined threshold. The instructions are also executable to demodulate the received signal with the interference canceled using a current channel estimate to obtain the current data.

An apparatus for canceling interference in a communication system is also disclosed. The apparatus includes means for receiving a signal that includes current data from a current access point and secondary data from one or more secondary access points. The apparatus also includes means for demodulating the secondary data using one or more secondary channel estimates if a signal metric is less than a predetermined threshold. The apparatus also includes means for canceling interference in the received signal using the demodulated secondary data if the signal metric is less than the predetermined threshold. The apparatus also includes means for demodulating the received signal with the interference canceled using a current channel estimate to obtain the current data.

A computer-program product for canceling interference in a communication system is also disclosed. The computer-program product comprises a computer-readable medium having instructions thereon. The instructions include code for receiving a signal that includes current data from a current access point and secondary data from one or more secondary access points. The instructions further include code for demodulating the secondary data using one or more secondary channel estimates if a signal metric is less than a predetermined threshold. The instructions also include code for canceling interference in the received signal using the demodulated secondary data if the signal metric is less than the predetermined threshold. The instructions also include code for demodulating the received signal with the interference canceled using a current channel estimate to obtain the current data.

FIG. 1 is a block diagram illustrating a wireless communication system 100 in which the methods disclosed herein may be utilized. The wireless communication system 100 may include one or more access points (AP) 102 that each may include multiple antenna groups. For example, the AP 102 may include three antenna groups, one group including a first antenna 104 and a second antenna 106, another group including a third antenna 108 and a fourth antenna 110, and another group including a fifth antenna 112 and a sixth antenna 114. While the configuration illustrates each antenna group with two antennas, more or less antennas may be included in each antenna group. The wireless communication system may also include a first access terminal (AT) 116 that communicates with the fifth antenna 112 and the sixth antenna 114, where the fifth antenna 112 and the sixth antenna 114 transmit information to the first access terminal 116 over a first forward link 120 and receive information from the first access terminal 116 over a first reverse link 118. Likewise, the wireless communication system 100 may also include a second access terminal (AT) 122 that communicates with the first antenna 104 and the second antenna 106, where the first antenna 104 and the second antenna 106 transmit information to the second access terminal 122 over a second forward link 126 and receive information from the second access terminal 122 over a second reverse link 124. In the wireless communication system 100, the communication links 118, 120, 124 and 126 may use different frequencies for communication. For example, the first forward link 120 may use a different frequency than the first reverse link 118.

Each group of antennas and/or the area in which they are designed to communicate is often referred to as a sector of the AP 102. In the illustrated configuration, the antenna groups may be designed to communicate to all ATs in a sector. In other words, each antenna group may be responsible for communicating with all of the ATs in a geographic area.

When communicating over the first forward link 120 and the second forward link 126, the transmitting antennas may utilize beamforming in order to improve the signal-to-noise ratio in the first AT 116 and the second AT 122, respectively. Additionally, the AP 102 may use beamforming when communicating with ATs scattered randomly throughout its coverage in order to minimize interference.

The AP 102 may be a fixed station used for communicating with the first AT 116 and second AT 122 and may be referred to as a base station, a Node B, or some other terminology. The first AT 116 and second AT 122 may be referred to herein as user equipment (UE), wireless communication devices, terminals, or some other terminology.

It should be noted that the wireless communication system 100 may include more than one AP 102 and more or less than two ATs. Additionally, the AP 102 may communicate using any suitable channel access method, e.g., Frequency Division Multiple Access (FDMA) networks, Orthogonal Frequency Division Multiple Access (OFDMA), etc.

Figure 2:
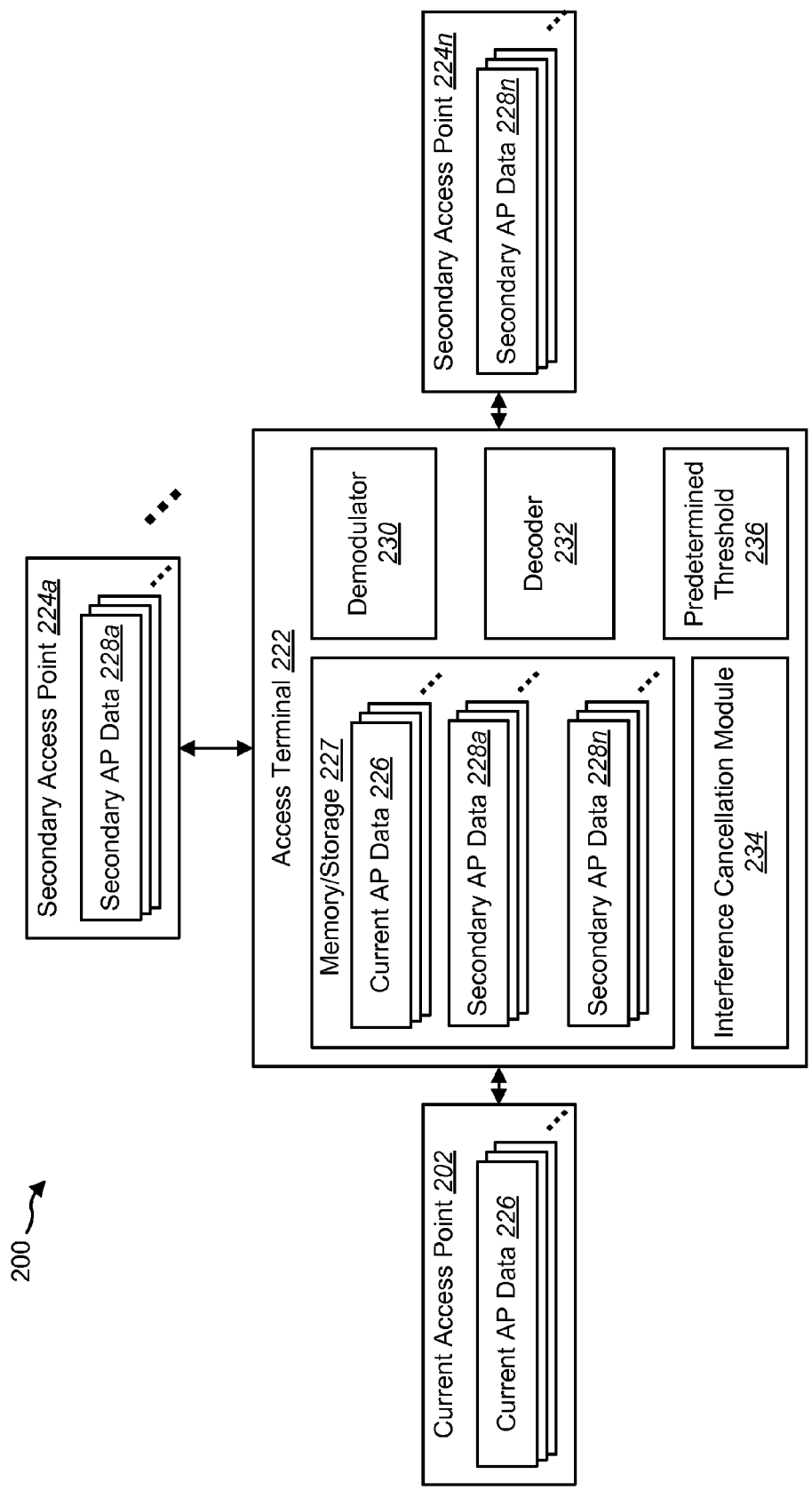
FIG. 2 is a block diagram of a system for canceling interference in a wireless communication system.

FIG. 2 is a block diagram of a system 200 for canceling interference in a wireless communication system. The AT 222 may communicate with the current AP 202 on a defined bandwidth. Additionally, secondary APs 224 may be communicating with other ATs (not shown) on the same bandwidth. The configuration illustrates n secondary APs 224 in the system 200. Thus, the AT 222 may receive unwanted interference from as many as n secondary APs 224. In other words, the AT 222 may be intentionally receiving non-control data from the current AP 202, but not from the secondary APs 224.

The current AP 202 and the secondary APs 224 may each include data. For example, the current AP 202 may include current AP data 226 and each secondary AP 224 may include secondary AP data 228. The current AP data 226 and the secondary AP data 228 may be organized into tiles when transmitted to the AT 222. As used herein, the term "tile" refers to a subset of tones in the time-frequency grid, i.e., a frequency range that is a fraction of the total bandwidth allocated to the AT 222. For example, if the total bandwidth allocated to the AT 222 is 10 MHz, the bandwidth may include 10 tiles of 1 MHz each.

The AT 222 may receive the current AP data 226 and the secondary AP data 228 from the current AP 202 and the secondary APs 224, respectively. This data may be stored in memory or other suitable storage medium 227 on the AT 222. The current AP data 226 may represent requested information and may be demodulated by the demodulator 230, decoded by the decoder 232, or both. For example, the current AP data 226 may include voice data for a current telephone call, or data requested from a server via a browser. The current AP data 226 may not use the entire bandwidth available. For example, the current AP 202 may lower the communication data rate used when communicating with the AT 222 when the AT 222 is physically far away from the current AP 202. A lower data rate may use fewer tiles to send the current AP data 226, which means that the AT 222 has to process a reduced number of tiles to receive the AP data 226. Thus, the AT 222 may have left-over processing resources to process other tiles, e.g., tiles from secondary APs 224 for interference cancellation. The secondary AP data 228 may represent unwanted data from the secondary APs 224, such as interference. This secondary AP data 228 may degrade, or interfere, with current AP data 226. For example, the secondary AP data 228 may introduce noise onto the current AP data 226 and thus lower the quality of a current telephone call. As before, the physical proximity of the AT 222 to the secondary APs 224 may affect the amount of interference. Specifically, as the AT 222 moves farther away from the current AP 202, it may move closer to one or more secondary APs 224. Thus, when the AT 222 is relatively far away from the current AP 202, the data rate may be lowered, resulting in a lower amount of tiles used for sending the current AP data 226.

To do this, an interference cancelation module 234 may compare a bandwidth metric to a predetermined threshold 236. The bandwidth metric may be any metric that indicates the relative available bandwidth of the AT 222, e.g., the number of data tiles, the number of available tiles, the proportion of data tiles to total tiles, the proportion of available tiles to total tiles, etc. As used herein, the term "data tile" refers to a tile that is used to transmit data and the term "available tile" refers to a tile that is not used to transmit data and thus available for other uses, such as interference cancelation. The predetermined threshold 236 may be a fixed value that, when compared to the bandwidth metric, indicates whether the interference should be canceled. In one configuration, there are 128 total tiles in the bandwidth of the AT 222, the bandwidth metric is the number of data tiles, and the predetermined threshold 236 is 64. In other words, the predetermined threshold 236 may be half of the total number of data tiles in the bandwidth on which the current AP data 226 is transmitted. Therefore, in this configuration, the interference cancelation module 234 may cancel the interference if the current AP data 226 consumes less than 64 tiles. Additionally, the predetermined threshold 236 may be a configurable value. It should be appreciated that any combination of bandwidth metric and predetermined threshold 236 may be used to evaluate whether the interference from the secondary APs 224 should be canceled. The interference cancelation module 234 may reside, among other places, in the demodulator 230 or the decoder 232.

The interference cancelation module 234 may use excess processing power to cancel interference in the received signal. In other words, secondary data 228 may be demodulated, interference in the received signal may be canceled using the demodulated secondary data 228, and the received signal with canceled interference may then be demodulated using a current channel estimate.

Figure 3:
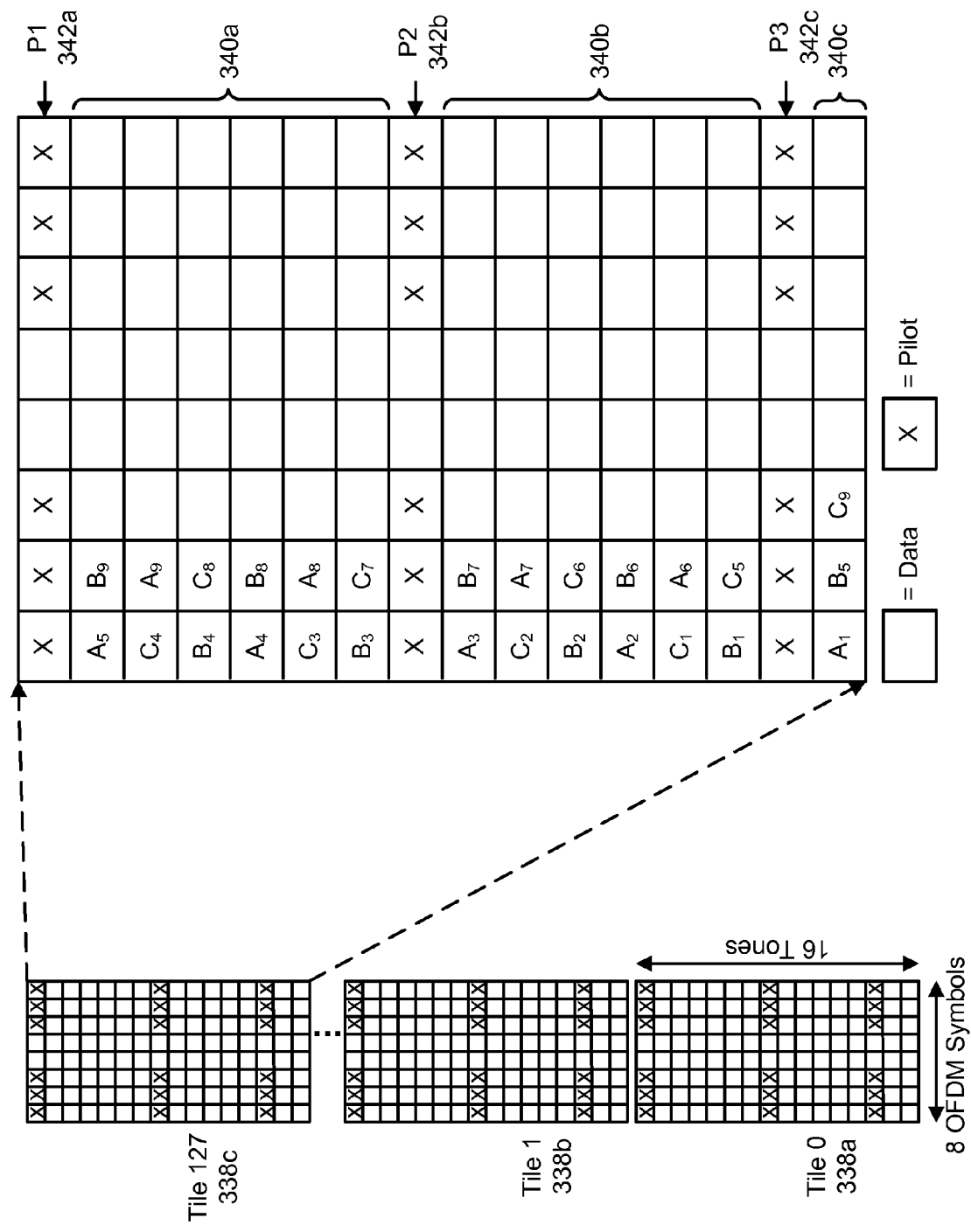
FIG. 3 is a block diagram illustrating one configuration of tiles in a wireless communication system.

FIG. 3 is a block diagram illustrating one configuration of tiles 338 in a wireless communication system 200. In other words, a wireless signal, such as an OFDMA or FDMA signal, may be broken into 128 tiles 338. As described above, a tile 338 may be a portion of the bandwidth, or frequency range, allocated to the AT 222. Each tile 338 may be used to transmit 16 separate tones (or sub-channels) over 8 symbols such that each tile 338 may transmit as many as 128 symbols. As used herein, the term "symbol" refers to one or more modulated bits. The bit(s) may be modulated using any suitable modulation scheme, e.g., 2-bit data (QPSK), 3-bit data (8PSK), 4-bit data (16 QAM) and/or 6-bit data (64 QAM), etc.

In the illustrated configuration, each of the tiles 338 may transmit both data symbols and pilot symbols. The data symbols may be used to carry information, such as voice data for a telephone call or requested data from a server, and pilot symbols may be used to perform a wide variety of tasks, including estimating the physical channel between an AP 202, 224 and the AT 222. Channel estimates may be used by the AT 222 to demodulate data, cancel interference, or both.

Since each tile 338 may transmit both pilot symbols and non-pilot symbols, each tile 338 may be configured in a variety of ways. Specifically, each tile may transmit data from several subpackets as well as one or more pilot signals. In one configuration, the symbols from one or more subpackets are "painted" on non-pilot tones 340 in a round-robin fashion across one or more tiles 338.

In the illustrated configuration, the $128^{th}$ tile 338c is assigned to transmit three sub-packets of information {A, B, C} where sub-packet {A} includes data symbols ($A_1, A_2, A_3$ ...), sub-packet {B} includes data symbols ($B_1, B_2, B_3$ ...), and sub-packet {C} includes data symbols ($C_1, C_2, C_3$ ...). Note that the various symbols may be "painted" on non-pilot tones 340 in a round-robin fashion. Painting patterns may allow for pipelining of demodulation and decoding operations performed by the AT 222. Note also that each tile 338 may also transmit pilot data on one or more pilot tones 342.

Figure 4:
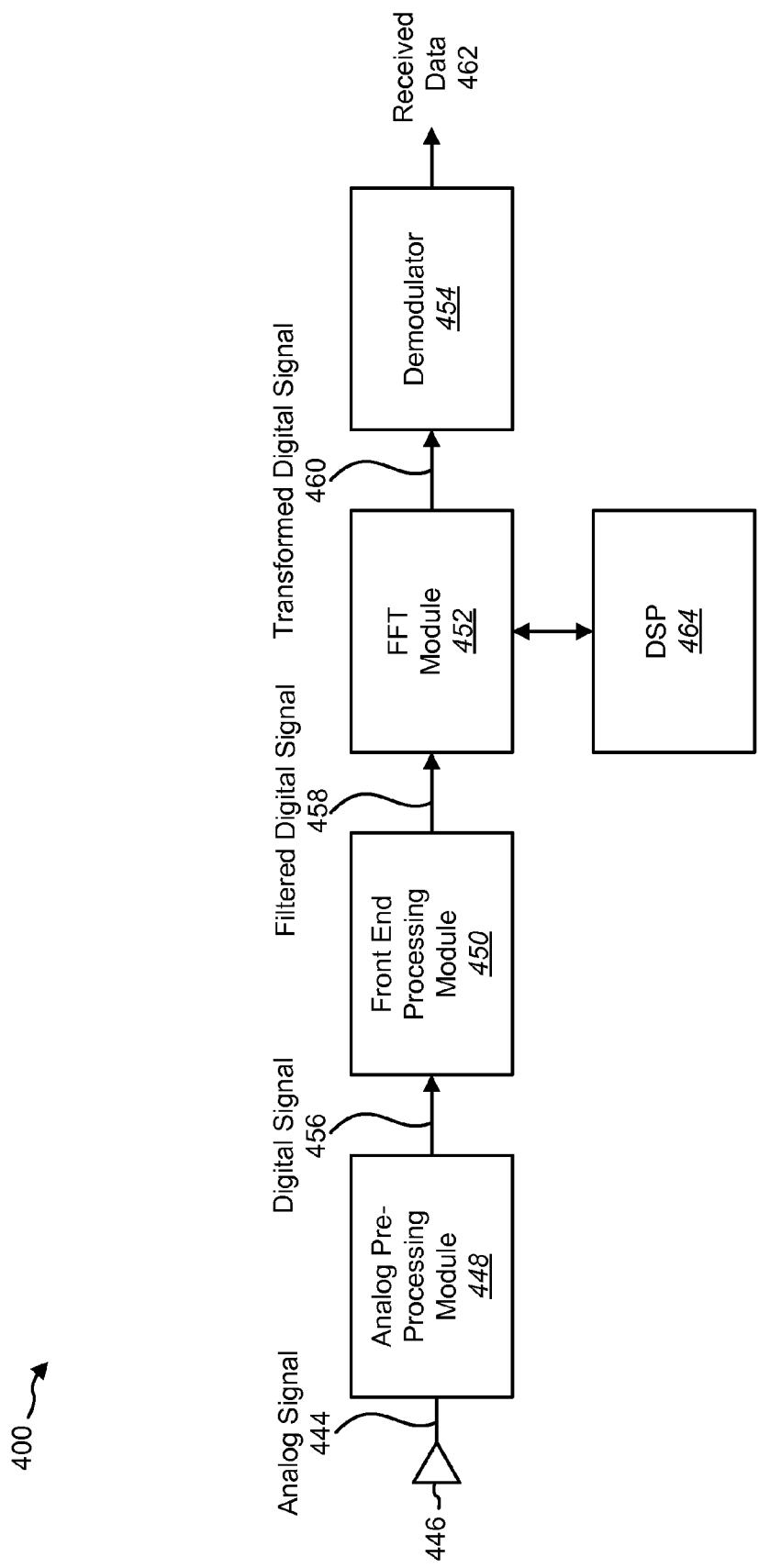
FIG. 4 is a block diagram illustrating a system for receiving and processing data.

FIG. 4 is a block diagram illustrating a system 400 for receiving and processing data. The system may operate as part of an AT 222 before any interference is canceled. First, an analog preprocessing module 448 may receive an analog signal 444 via one or more antennas 446. The analog signal 444 may be transmitted from the current AP 202 and may include modulated and encoded data. The analog preprocessing module 448 may perform various processing on the analog signal 444, such as buffering, filtering, mixing, and analog to digital conversion. The analog preprocessing module 448 may then provide a digital signal 456 to a front end processing module 450. Note that although the configuration illustrates a single received analog signal 444 and digital signal 456, the system 400 may receive and process multiple analog signals 444.

The front end processing module 450 may further process the digital signal 456, e.g., DC offset correction, digital filtering, IQ correction, frequency correction and digital gain control. This may produce a filtered digital signal 458 that may be sent to a FFT module 452.

The FFT module 452 may process the filtered digital signal 458 using Fast Fourier Transforms (FFT) or Discrete Fourier Transforms (DFT) under control of a Digital Signal Processor (DSP) 464. The DSP may be any form of sequential instruction processing machine.

The FFT module 452 may then pass the transformed digital signal 460 to a demodulator 454. The demodulator 454 may perform any number of demodulation operations to produce one or more demodulated outputs, e.g., Minimum Mean Square Error (MMSE), Maximum Ratio Combining (MRC), and any other MIMO demodulation techniques. Each output of the demodulator 454 may be arranged logically in a manner consistent with the tiles 338 illustrated in FIG. 3 and may represent the received data 462 from the current AP 202. Note that each symbol transmitted in the tiles 338 may include a real portion (I), a complex portion (Q), and a related Signal to Noise Ratio (SNR).

Figure 5:
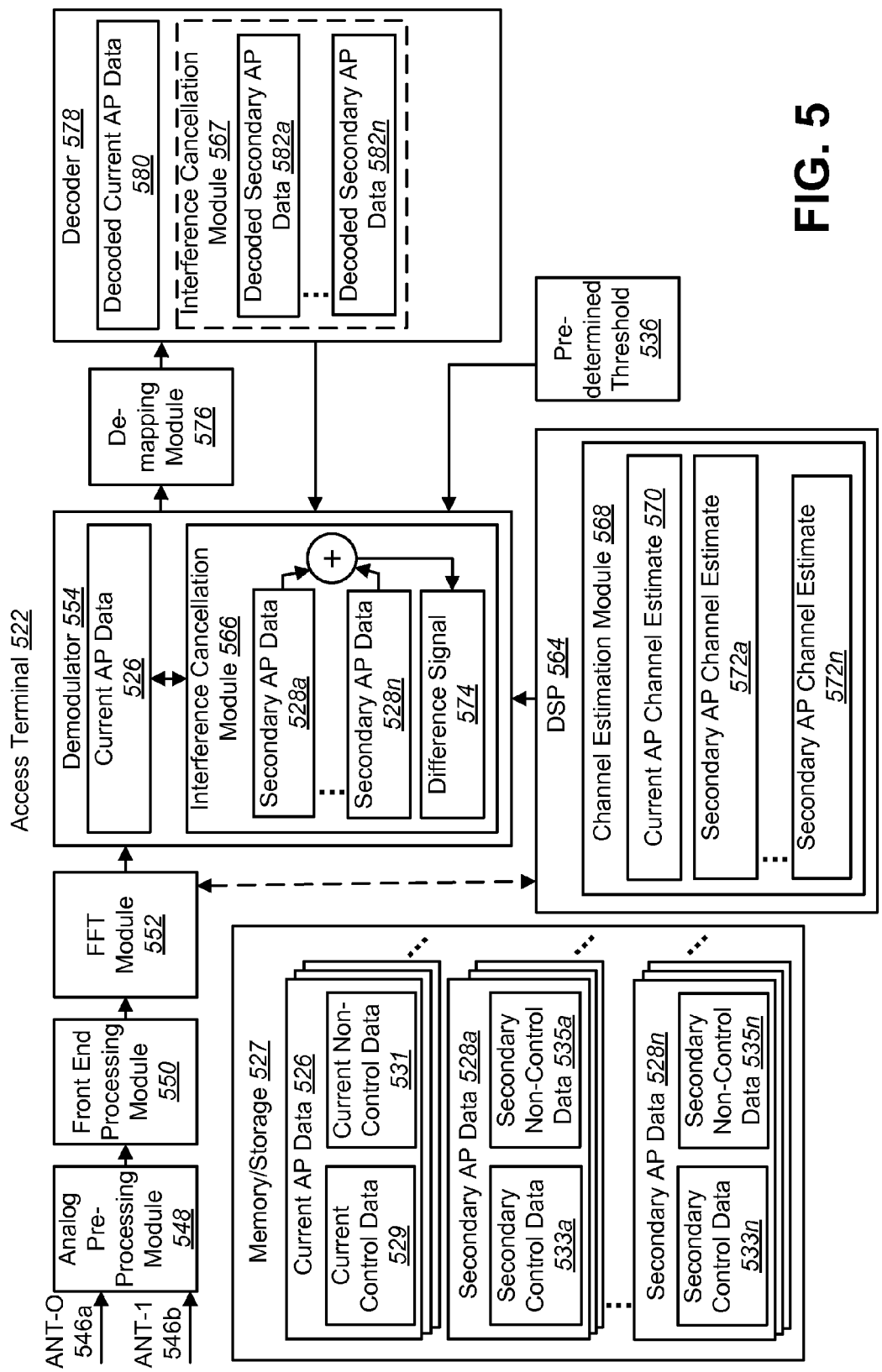
FIG. 5 is a block diagram of an Access Terminal (AT) for canceling interference in a wireless communication network.

FIG. 5 is a block diagram of an Access Terminal (AT) 522 for canceling interference in a wireless communication network. At any given time, the AT 522 may receive non-control data from the current AP 202. As used herein, the term "current AP" refers to the AP with which the AT 522 intentionally communicates. In other words, the current AP 202 is the AP primarily responsible for communicating with the region in which the AT 522 resides. The current AP data 526 may be sent using tiles 338. The AT 522 may also perform channel estimation and/or demodulation using tiles 338. When the AT 522 is physically far away from the current AP 202, the current AP 202 may send the current AP data using limited data rates. In other words, the current AP data 526 may use fewer tiles than the number of tiles available for transmission. In such scenarios, the excess processing capability of the AT 522, indicated by the number of available tiles, may be utilized to perform channel estimation and demodulation of the secondary AP data 528. Thus, the AT 522 may use excess processing capability to cancel interference from the current AP data 526 according to the following description.

Similar to the configuration illustrated in FIG. 4, an analog preprocessing module 548, front end processing module 550, and FFT module 552 may perform various processing on a received signal. This processing may include buffering, filtering, mixing, and analog to digital conversion.

The FFT module 552 may process the filtered digital signal using Fast Fourier Transforms (FFT) or Discrete Fourier Transforms (DFT) under control of a Digital Signal Processor (DSP) 564. The DSP may be any form of sequential instruction processing machine.

A demodulator 554 may then perform one or more demodulation operations to produce one or more demodulated outputs. In other words, the demodulation scheme may correspond to the modulation scheme used by the current AP 202, e.g., 2-bit data (QPSK), 3-bit data (8PSK), 4-bit data (16 QAM) and/or 6-bit data (64 QAM), etc. Techniques such as Minimum Mean Square Error (MMSE), Maximum Ratio Combining (MRC), and any other MIMO demodulation scheme may also be used. Note that each symbol transmitted in the tiles 338 may include a real portion (I), a complex portion (Q), and a related Signal to Noise Ratio (SNR).

As described above, the AT 522 may receive current AP data 526 as well as secondary AP data 528 from one or more secondary APs 224. A signal received by an antenna (e.g., antennas 546a, 546b) may include current AP data 526 from a current access point and secondary AP data 528 from one or more secondary access points. The secondary AP data 528 may cause interference in the current AP data 526. In other words, the secondary AP data 528 may be interference to the current AP data 526. Furthermore, the current AP data 526 may include current control data 529 and current non-control data 531 and the secondary AP data 528 may include secondary control data 533 and secondary non-control data 535. The current control data 529 and the secondary control data 533 may include one or more pilot signals that may be used to estimate the physical channel between the AT 522 and the current AP 202 and the secondary ATs 224, respectively. The demodulator 554 may receive and demodulate a transformed digital signal from the FFT module 552. The demodulator may utilize a current AP channel estimate 570 and a secondary AP channel estimate 572 from a DSP 564 when demodulating the transformed digital signal from the FFT module 552. A channel estimation module 568 in the DSP 564 may determine a secondary channel estimate 572 for every secondary AP 224 contributing to interference on the current AP data 526. Channel estimation may be used with any modulation scheme, e.g., QAM, QPSK, etc. In one configuration, there are n secondary APs 224. Thus, there may be n secondary AP channel estimates. The current AP channel estimate 570 may be determined using the current control data 529 in the current AP data 526, e.g., pilot data from the current AP 202. Likewise, each secondary AP channel estimate 572 may be determined using secondary control data 533 in the secondary AP data 528, e.g., pilot data from the secondary APs 224. Furthermore, the demodulator 554 may store the current AP data 526 and the secondary AP data 528 in memory or other suitable storage medium 527.

The interference cancelation module 566 may compare current AP data 526 to the predetermined threshold 536 to determine whether to cancel the interference in the current AP data 526. The predetermined threshold 536 may be a fixed value that, when compared to a metric in the current AP data 526, indicates whether the interference should be canceled. In other words, the interference cancelation module 566 may use the number of data tiles used by the current AP data 526 with the predetermined threshold 536 to evaluate whether there is sufficient processing capability to cancel interference in the current AP data 526. Additionally, the predetermined threshold 536 may be a configurable value. This use of excess processing resources to perform interference cancelation when the data rates are lower may improve performance in the AT 522 without sacrificing resources being used. In other words, the systems and methods disclosed herein may benefit from a scenario that regularly occurs at the edge of wireless coverage, i.e., lower data rate with more available tiles.

Alternatively, or in addition to, the interference cancelation module 566 may use a metric other than the data tiles used by the current AP data 526, e.g., the number of available tiles in the received signal, or the proportion of data tiles to total tiles in the received signal, the proportion of available tiles to total tiles in the received signal, etc. In one configuration, there are 128 total tiles and the predetermined threshold is 64. If the current AP data 526 uses less than 64 tiles, the interference cancelation module 566 may determine that interference cancelation is appropriate. If, however, the current AP data 526 uses 64 tiles or more, the interference cancelation module 566 may determine that interference cancelation is not appropriate.

The process of canceling interference from the current AP data 526 may include subtracting out the secondary AP data 528 from the received signal to produce a difference signal 574. In one configuration, the difference signal 574 may be demodulated to obtain current AP data 526. While the illustrated configuration shows interference cancelation for n secondary APs 224, it should be appreciated that there may be only one secondary AP 224 present in the wireless communication system. Additionally, the interference cancelation module 566 may only cancel the interference from one of the n secondary APs 224. In other words, improvement in the quality of the current AP data 526 may be achieved by only canceling the interference from the most significant of multiple secondary APs 224. Also, the interference cancelation may be limited by the "left-over" processing resources, i.e., the processing resources may be limited by the number of unused available tiles. As used herein, the word "subtracting" is used broadly, and may refer to any suitable interference cancelation technique.

In one configuration, the interference cancelation module 566 may receive input from the decoder 578. In other words, the decoded secondary AP data 582a-582n may be used for reconstructing the interference component that is canceled.

Following the interference cancelation, the output of the demodulator 554 may be sent to the demapping module 576 that may further process the difference signal 574. Specifically, the demapping module 576 may, among other functions, generate Log-Likelihood-Ratios (LLR) that may convey the soft information to the decoder 578. Furthermore, the demapping module 576 may sub-packetize, descramble, and de-interleave the difference signal 574. Sub-packetization may include converting tile-based data in the difference signal 574 into data organized as sub-packets (sub-packetization). Descrambling may include descrambling the sub-packets. De-interleaving may undo the interleaving done at an encoder.

The demapping module 576 may then send the demapped signal to the decoder 578 for further processing. The decoder 576 may use any suitable decoding method, e.g., Turbo decoding, Viterbi decoding, etc.

While the interference cancelation module 566 has been described as part of the demodulator 554, an interference cancelation module 567 may also reside on the decoder 578. In this configuration, the current AP data 526 and secondary AP data 528 (that has been demodulated) are sent through the demapping module 576 and to the decoder 578. In the decoder 578, the decoded secondary AP data 582 may be processed and sent to the interference cancelation module 566 for use as described above. Whether the interference cancelation module 566 is implemented in the demodulator 554 or receives input from the decoder 578, using the same building blocks for demodulating both signal and interference may improve the efficiency of the AT 522. In other words, by utilizing already present hardware, the DSP 564 for channel estimation and the demodulator 554 for demodulation, the systems and methods described herein may improve performance in the AT 522 with existing hardware. In one configuration, the systems and methods are made possible by the tile-based architecture in the AT 522 and a task-list interface between the AT 522 hardware and firmware that indicates the sector information of the AP to be demodulated.

FIG. 6 is a flow diagram illustrating a method 600 for canceling interference in a wireless communication network. The method 600 may be performed by an AT 222 that communicates with a current AP 202 and one or more secondary APs 224. First, the AT 222 may receive 688 a signal that includes current AP data 226 from a current AP 202 and secondary AP data 228 from a secondary AP 224. The current AP data 226 may include requested data, e.g., voice data during a telephone call or requested data from a server. The secondary AP data 228 may be interference for the current AP data 226. Additionally, the current AP data 226 may be transmitted using one or more tiles. The AT 222 may have a defined allocated bandwidth, or frequency range, to use when communicating with the current AP 202. The total available bandwidth may be a system parameter, while the allocated bandwidth may be proportional to the data rate allocated to the AT 222 and may be defined by the current AP 202.

In a neighboring sector or cell, a secondary AP 224 may be communicating with a different AT (not shown) on the same bandwidth. This communication may introduce interference into the current AP data 226 signal received at the AT 222. Traditionally, the secondary AP data 228 from the secondary APs 224 may be ignored. However, the AT 222 may demodulate and/or decode this secondary AP data 228 in order to cancel the interference off of the current AP data 226. Interference may be especially destructive at the edges of a geographic cell.

The secondary AP data 228 may be demodulated 690 using one or more secondary channel estimates. In one configuration, the secondary AP data 228 may be demodulated 690 only if the number of tiles used to transmit the current AP data 226 is less than a predetermined portion of the total bandwidth. For example, if the total bandwidth available is equivalent to 128 tiles, the predetermined threshold may be 64. Thus, if the current AP data 202 uses less than 64 tiles to transmit the current AP data 226, the secondary AP data 224 may be demodulated 690.

The AT 222 may then cancel 692 interference in the received signal using the demodulated secondary AP data 228. The interference cancelation 692 may only be performed if the number of tiles used to transmit the current AP data 226 is less than a predetermined portion of the total bandwidth. This interference cancelation 692 may be performed by an interference cancelation module 234 that resides on a demodulator 230 and may include subtracting the demodulated secondary AP data 228. A signal that goes through the interference cancelation module 234 may also be demodulated and further decoded. Any interference cancelation technique may be used, e.g., MMSE, Linear MMSE, matched filtering, etc. In another configuration, interference cancelation 692 may be performed by an interference cancelation module 234 that receives input from the decoder 232. In either configuration, the decoded output may represent usable current AP data 226 with canceled or minimized interference.

The AT 222 may then demodulate 694 the received signal with interference canceled using a current channel estimate to obtain the current AP data 226. The bit(s) may be demodulated using any suitable demodulation scheme. In other words, the demodulation scheme may correspond to the modulation scheme used by the current AP 202, e.g., 2-bit data (QPSK), 3-bit data (8PSK), 4-bit data (16 QAM) and/or 6-bit data (64 QAM), etc. Additional techniques such as Minimum Mean Square Error (MMSE) or Maximum Ratio Combining (MRC) may also be used.

Additionally, the demodulator 230 may utilize a current AP channel estimate 570 and one or more secondary AP channel estimates 572 to demodulate the current AP data 226 with canceled interference and the secondary AP data 228, respectively. The current AP channel estimate 570 and the secondary AP channel estimate(s) 572 may be determined in any suitable manner.

Figure 6A:
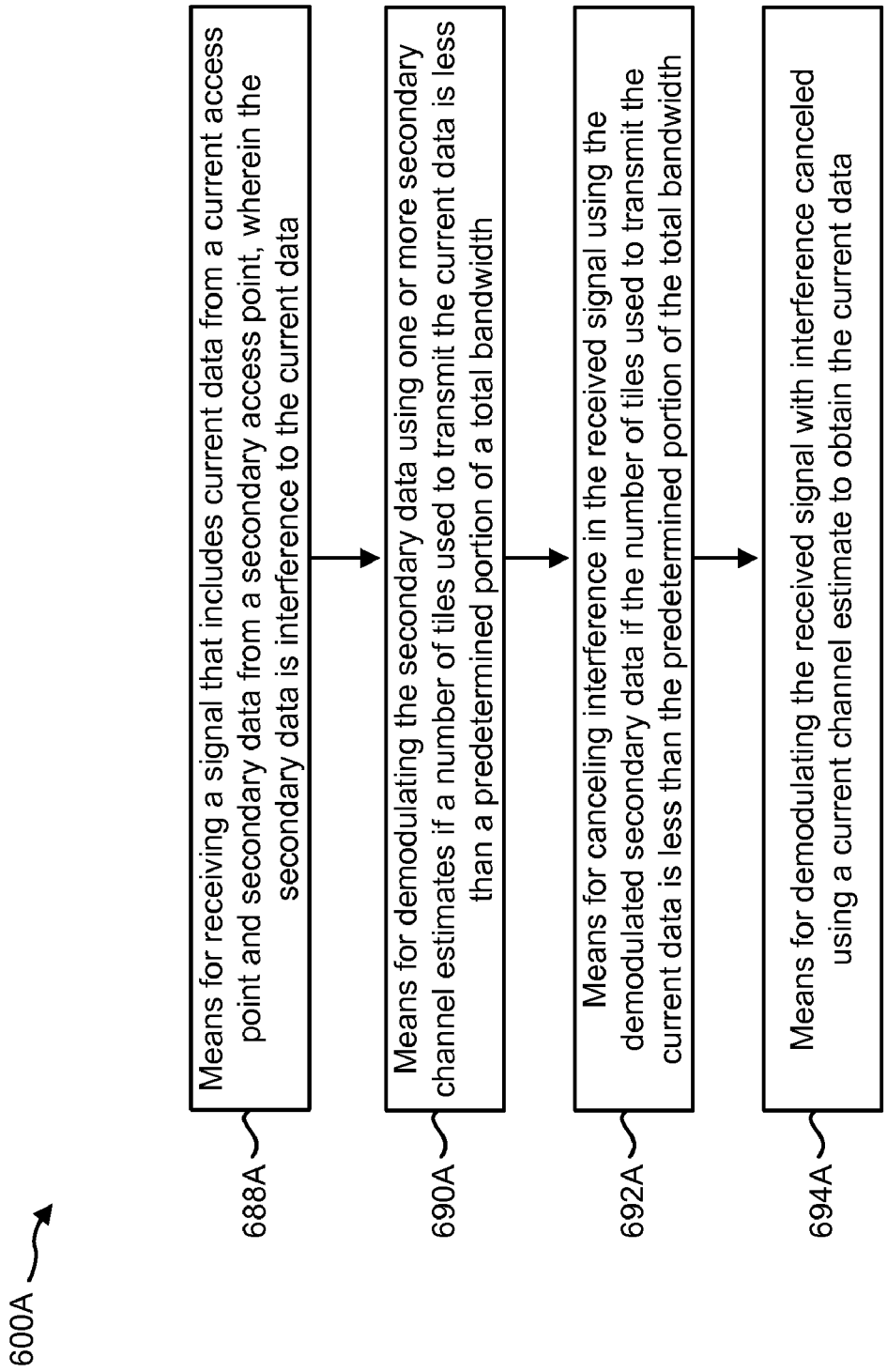
FIG. 6A illustrates means-plus-function blocks corresponding to the method of FIG. 6.

The method 600 of FIG. 6 described above may be performed by various hardware and/or software component(s) and/or module(s) corresponding to the means-plus-function blocks 600A illustrated in FIG. 6A. In other words, blocks 688 through 694 illustrated in FIG. 6 correspond to means-plus-function blocks 688A through 694A illustrated in FIG. 6A.

Figure 7:
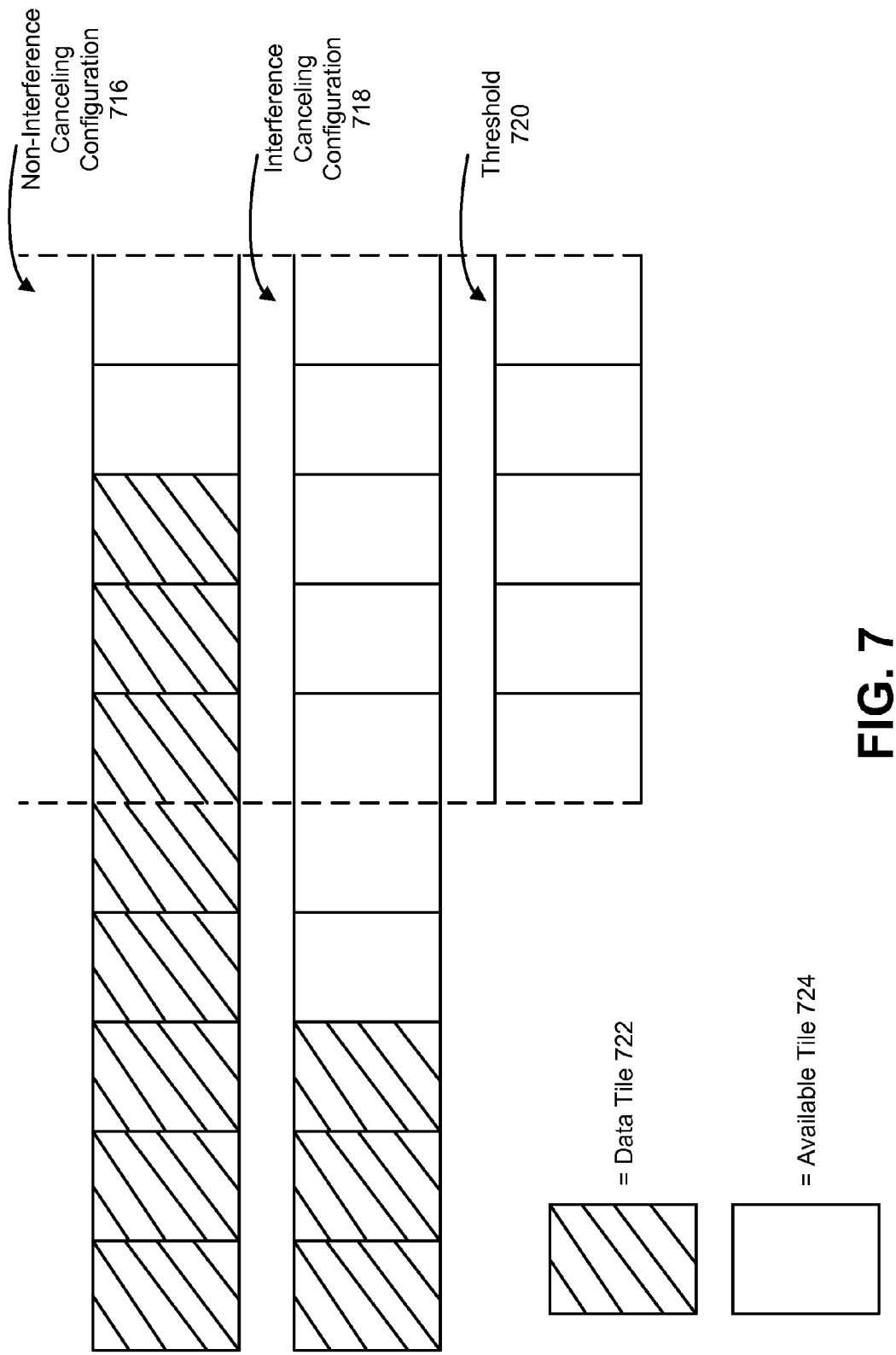
FIG. 7 is a block diagram illustrating two configurations where interference cancelation may or may not be done.

FIG. 7 is a block diagram illustrating two configurations where interference cancelation may or may not be done. The configurations may represent the data received by an AT 222 from a current AP 202 in relation to the total available bandwidth. In the first, non-interference cancelation configuration 716, there are 10 tiles in the total bandwidth available. As illustrated, this configuration 716 includes eight (8) data tiles 722 and only two (2) available tiles 724. This may be typical when the AT 222 is close to a current AP 202 because the data rate of the communication may be relatively high. Thus the current AP data 226 may occupy a large portion of the total number of tiles. In this configuration 716, the AT 222 may compare the number (8) of data tiles 722 to the threshold 720. In other words, the threshold 720 may be half of the total number of tiles, including both data tiles 722 and available tiles 724, in the bandwidth on which the current AP data 226 was transmitted. Since, there are not less than 5 data tiles 722, or half the total bandwidth, the interference on the received signal may not be canceled.

In the second, interference cancelation configuration 718, there are also 10 tiles in the total bandwidth available. As illustrated, this configuration 718 includes 3 data tiles 722 and 7 available tiles 724. This may be typical when the AT 222 is far from a current AP 202 because the data rate of the communication may be low. Thus, the current AP data 226 may occupy a small portion of the total number of tiles. In this configuration 718, the AT 222 may compare the number (3) of data tiles 722 to the threshold 720. Since, there are less than 5 data tiles 722, or half the total bandwidth, the interference on the received signal may be canceled.

Note that many configurations for determining whether to cancel the interference on a received signal are possible. For example, there may be 128 total tiles and the received signal may need half (64) or more of the available tiles 724 before interference cancelation is performed. Additionally, the AT 222 may compare different types of metrics to each other when determining whether to cancel the interference in a received signal, e.g., the number of available tiles 724, the number of data tiles 722, the proportion of available tiles 724 to total tile bandwidth, the proportion of data tiles 722 to total tile bandwidth, etc. Likewise, the threshold 720 may be any fixed value that, when compared to a metric in the received signal, indicates whether the interference in the signal should be canceled. In the illustrated configuration, the threshold is 5, but it could be any number, fraction or integer.

Figure 8:
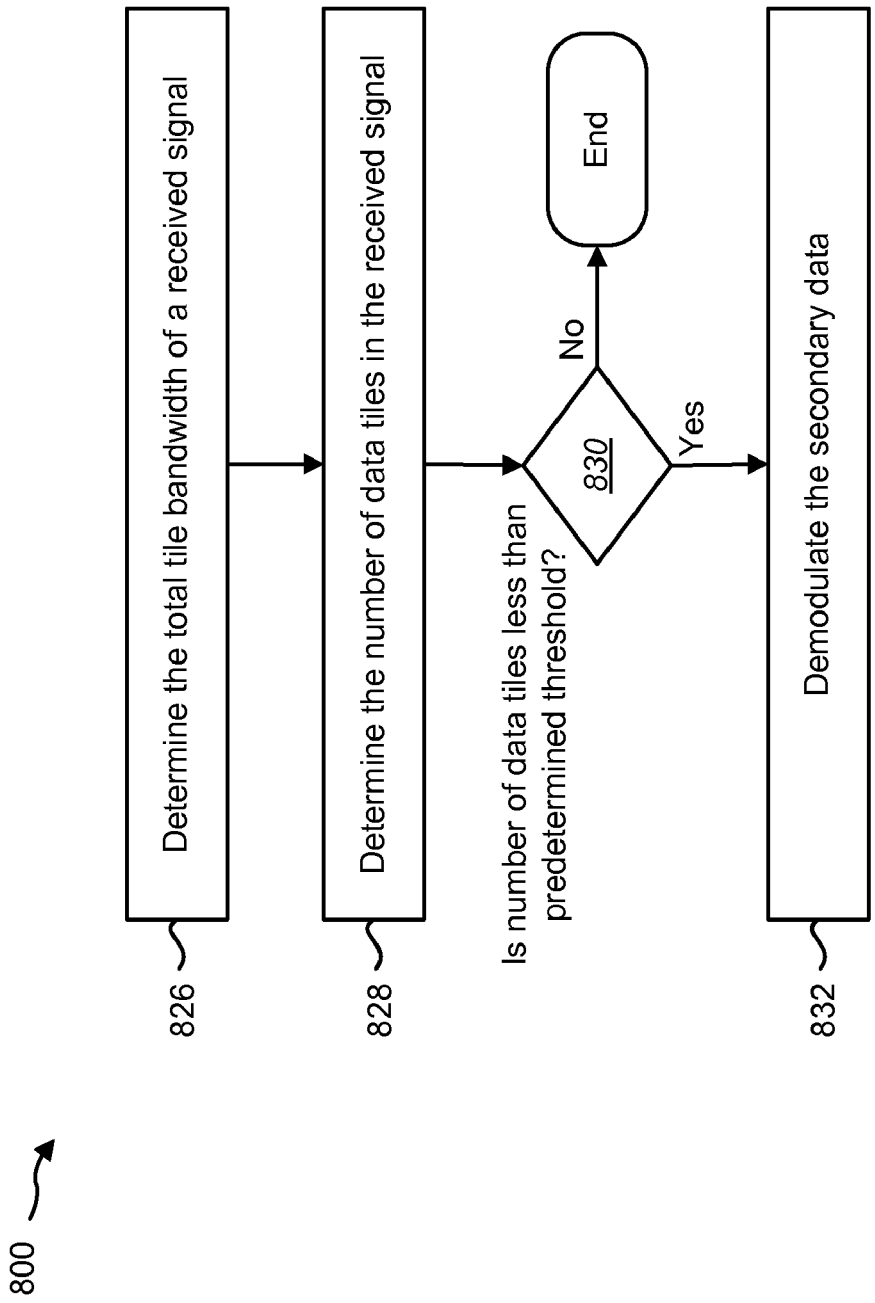
FIG. 8 is a flow diagram illustrating a method for determining whether to cancel interference in received data.

FIG. 8 is a flow diagram illustrating a method 800 for determining whether to cancel interference in received data. The method 800 may be performed in an AT 222. In other words, the method 800 may correspond to element 690 in FIG. 6.

First, the AT 222 may determine 826 the total tile bandwidth of a received signal. The received signal may be sent from a current AP 202 and may include current AP data 226.

The total tile bandwidth may be determined by the current AP 202 or various parameters within the wireless communication system 200. Next, the AT 222 may determine 828 the number of data tiles 722 in the received signal. This may include determining the number of tiles used by the current AP data 226 in the received signal. The AT 222 may then determine 830 whether a metric from the received signal is less than a threshold. In one configuration, the AT 222 may determine whether the number of data tiles 722 in the received signal is less than a predetermined threshold 720. If so, the AT 222 may demodulate 832 the secondary AP data 228.

Figure 8A:
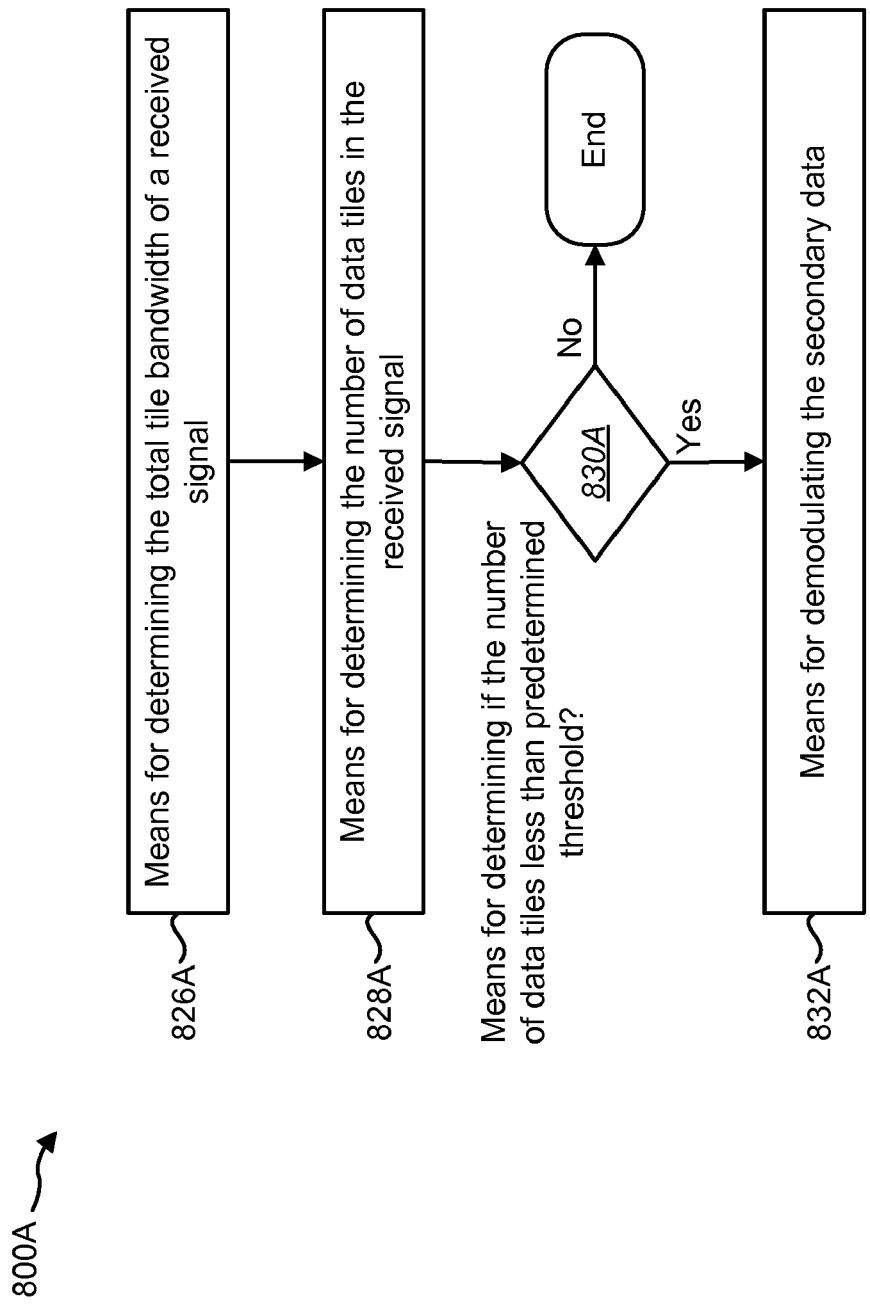
FIG. 8A illustrates means-plus-function blocks corresponding to the method of FIG. 8.

The method 800 of FIG. 8 described above may be performed by various hardware and/or software component(s) and/or module(s) corresponding to the means-plus-function blocks 800A illustrated in FIG. 8A. In other words, blocks 826 through 832 illustrated in FIG. 8 correspond to means-plus-function blocks 826A through 832A illustrated in FIG. 8A.

Figure 9:
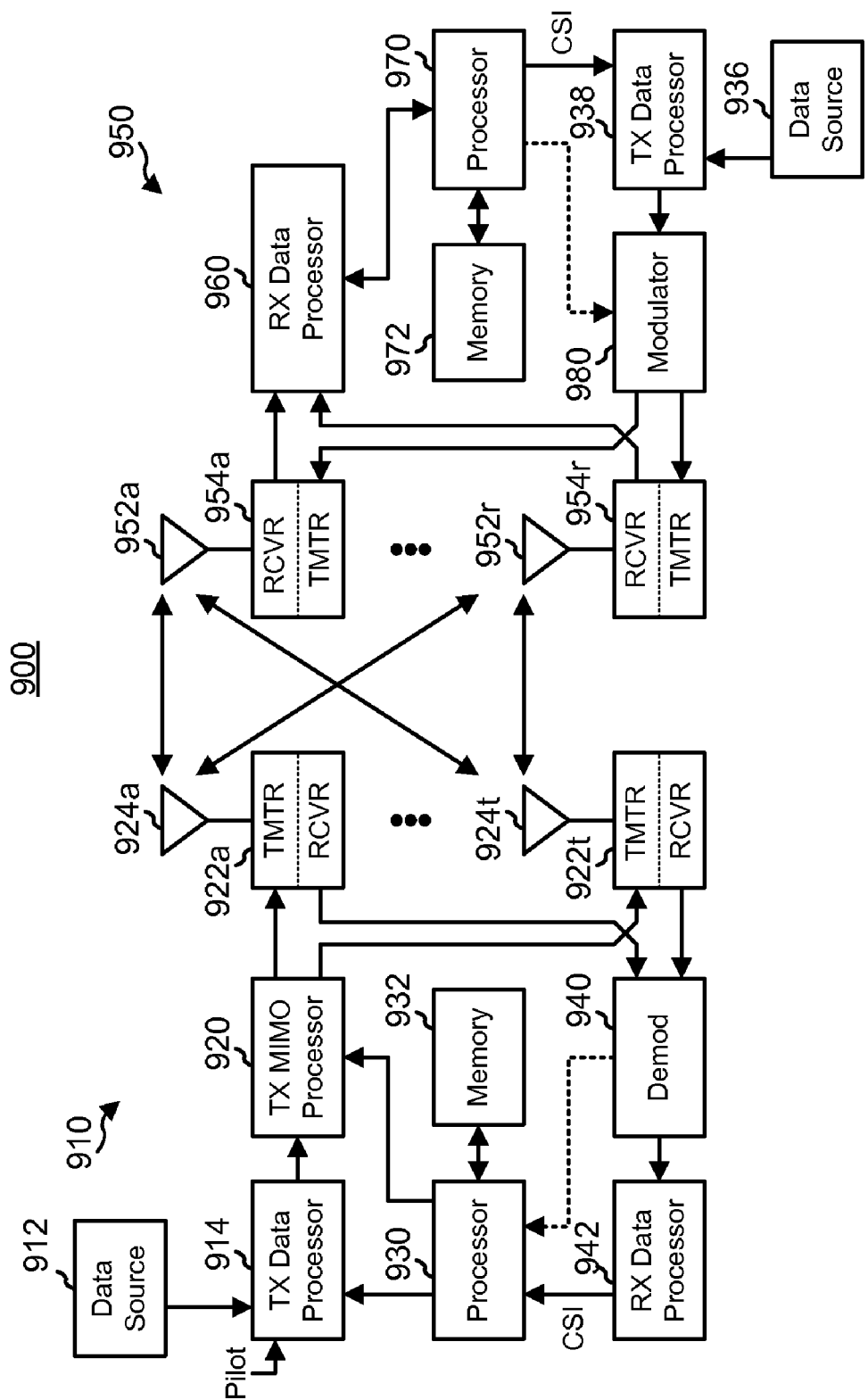
FIG. 9 is a block diagram of a transmitter system (also known as the access point) and a receiver system (also known as access terminal) in a MIMO system.

FIG. 9 is a block diagram of a transmitter system 910 (also known as the access point) and a receiver system 950 (also known as access terminal) in a MIMO system 900. For example, the system 900 may be implemented in an AT 222, a current AP 202, and/or a secondary AP 224. At the transmitter system 910, traffic data for a number of data streams may be provided from a data source 912 to a transmit (TX) data processor 914.

In one configuration, each data stream is transmitted over a respective transmit antenna. TX data processor 914 may format, encode, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then be modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 930.

The modulation symbols for all data streams may then be provided to a TX MIMO processor 920, which may further process the modulation symbols (e.g., for OFDM). TX MIMO processor 920 then provides NT modulation symbol streams to $N_T$ transmitters (TMTR) 922a through 922t. In some configurations, TX MIMO processor 920 may apply beamforming weights to the symbols of the data streams and to the antenna from which the symbol is being transmitted.

Each transmitter 922 may receive and process a respective symbol stream to provide one or more analog signals, and further condition (e.g., amplifies, filters, and upconverts) the analog signals to provide a modulated signal suitable for transmission over the MIMO channel. $N_T$ modulated signals from transmitters 922a through 922t may then be transmitted from $N_T$ antennas 924a through 924t, respectively.

At receiver system 950, the transmitted modulated signals may be received by NR antennas 952a through 952r and the received signal from each antenna 952 may be provided to a respective receiver (RCVR) 954a through 954r. Each receiver 954 may condition (e.g., filters, amplifies, and downconverts) a respective received signal, digitize the conditioned signal to provide samples, and further process the samples to provide a corresponding "received" symbol stream.

An RX data processor 960 may then receive and process the NR received symbol streams from $N_R$ receivers 954 based on a particular receiver processing technique to provide $N_T$ "detected" symbol streams. The RX data processor 960 may then demodulate, deinterleave, and decode each detected symbol stream to recover the traffic data for the data stream. The processing by RX data processor 960 may be complementary to that performed by TX MIMO processor 920 and TX data processor 914 at transmitter system 910.

A processor 970 may periodically determine which precoding matrix to use (discussed below). The processor 970 may also formulate a reverse link message comprising a matrix index portion and a rank value portion.

The reverse link message may comprise various types of information regarding the communication link and/or the received data stream. The reverse link message may then be processed by a TX data processor 938, which may also receive traffic data for a number of data streams from a data source 936, modulated by a modulator 980, conditioned by transmitters 954a through 954r, and transmitted back to the transmitter system 910.

At the transmitter system 910, the modulated signals from receiver system 950 may be received by the antennas 924, conditioned by the receivers 922, demodulated by a demodulator 940, and processed by a RX data processor 942 to extract the reserve link message transmitted by the receiver system 950. The processor 930 may then determine which pre-coding matrix to use for determining the beamforming weights then process the extracted message.

Figure 10:
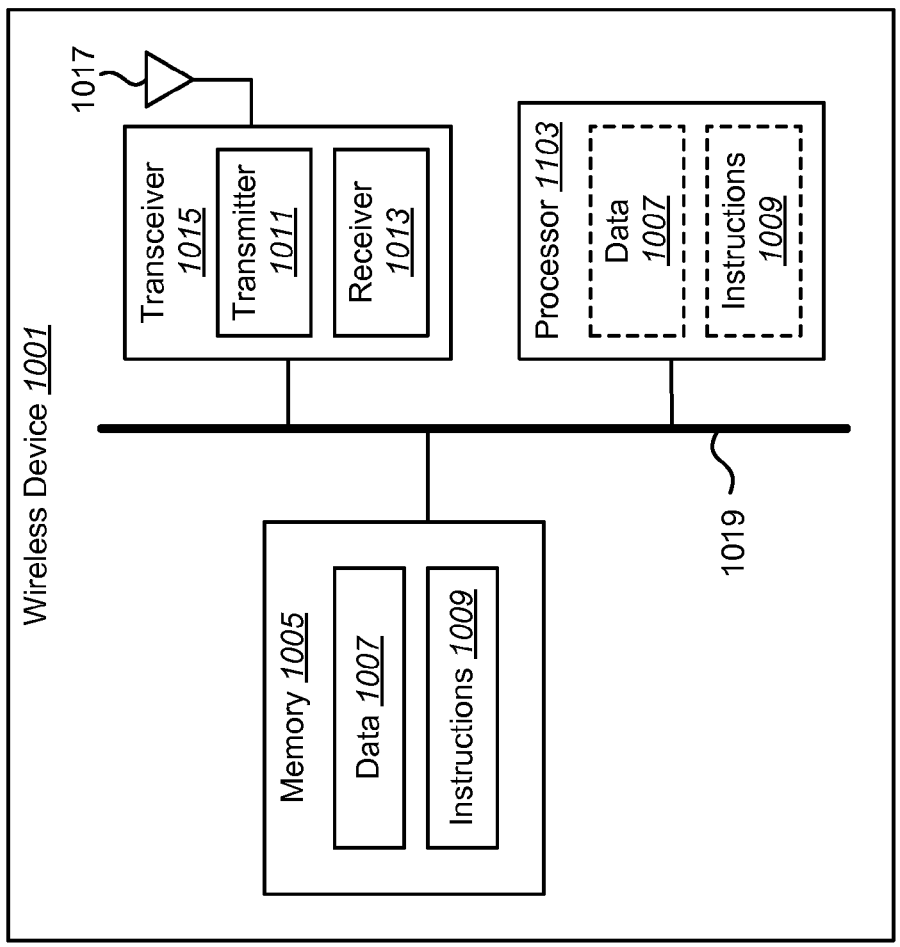
FIG. 10 illustrates certain components that may be included within a wireless device.

FIG. 10 illustrates certain components that may be included within a wireless device 1001. The wireless device 1001 may be an access terminal (AT) 222, a current access point (AP) 202, or a secondary access point (AP) 224.

The wireless device 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless device 1001 of FIG. 10, in an alternative configuration, a combination of processors (e.g., an ARM and DSP) could be used.

The wireless device 1001 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005.

The wireless device 1001 may also include a transmitter 1011 and a receiver 1013 to allow transmission and reception of signals between the wireless device 1001 and a remote location. The transmitter 1011 and receiver 1013 may be collectively referred to as a transceiver 1015. An antenna 1017 may be electrically coupled to the transceiver 1015. The wireless device 1001 may also include (not shown) multiple transmitters, multiple receivers, multiple transceivers and/or multiple antenna.

The various components of the wireless device 1001 may be coupled together by one or more buses, which may include a power bus, a control signal bus, a status signal bus, a data bus, etc. For the sake of clarity, the various buses are illustrated in FIG. 10 as a bus system 1019.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6 and 8 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for canceling interference in a communication system, comprising:
 receiving a signal that comprises current data from a current access point and secondary data from one or more secondary access points;
 demodulating the secondary data using one or more secondary channel estimates if a signal metric is less than a predetermined threshold, wherein the signal metric indicates an available fraction of a bandwidth allocated to a mobile device;
canceling interference in the received signal using the demodulated secondary data if the signal metric is less than the predetermined threshold; and
demodulating the received signal with the interference canceled using a current channel estimate to obtain the current data, wherein the signal metric is one of a number of tiles used to transmit the current data or a number of available tiles in the bandwidth on which the current data was transmitted, wherein the bandwidth is allocated proportional to a communication data rate.

2. The method of claim 1, wherein the predetermined threshold is half of the total number of tiles in the bandwidth on which the current data was transmitted.

3. The method of claim 1, wherein the predetermined threshold is a configurable value.

4. The method of claim 1, wherein the current data is sent from the current access point and the secondary data is sent from the one or more secondary access points using Orthogonal Frequency-Division Multiple Access (OFDMA) or Frequency Division Multiple Access (FDMA).

5. The method of claim 1, wherein the interference cancelation uses at least one of a Minimum Mean Square Error (MMSE) filter, a Linear MMSE filter, a matched filter, a Maximum Ratio Combining (MRC) filter, and a filter based on another Multiple Input Multiple Output (MIMO) demodulation scheme.

6. The method of claim 1, further comprising:
decoding the demodulated current data and the demodulated secondary data before canceling the interference.

7. The method of claim 1, further comprising:
determining the current channel estimate using pilot data received with the current data; and
determining the secondary channel estimates using pilot data received with the secondary data.

8. An apparatus for canceling interference in a communication system, comprising:
a processor;
memory in electronic communication with the processor;
instructions stored in the memory, the instructions being executable by the processor to:
receive a signal that comprises current data from a current access point and secondary data from one or more secondary access points;
demodulate the secondary data using one or more secondary channel estimates if a signal metric is less than a predetermined threshold, wherein the signal metric indicates an available fraction of a bandwidth allocated to a mobile device;
cancel interference in the received signal using the demodulated secondary data if the signal metric is less than the predetermined threshold; and
demodulate the received signal with the interference canceled using a current channel estimate to obtain the current data, wherein the signal metric is one of a number of tiles used to transmit the current data or a number of available tiles in the bandwidth on which the current data was transmitted, wherein the bandwidth is allocated proportional to a communication data rate.

9. The apparatus of claim 8, wherein the predetermined threshold is half of the total number of tiles in the bandwidth on which the current data was transmitted.

10. The apparatus of claim 8, wherein the predetermined threshold is a configurable value.

11. The apparatus of claim 8, wherein the current data is sent from the current access point and the secondary data is sent from the one or more secondary access points using Orthogonal Frequency-Division Multiple Access (OFDMA) or Frequency Division Multiple Access (FDMA).

12. The apparatus of claim 8, wherein the interference cancelation uses at least one of a Minimum Mean Square Error (MMSE) filter, a Linear MMSE filter, a matched filter, a Maximum Ratio Combining (MRC) filter, and a filter based on another Multiple Input Multiple Output (MIMO) demodulation scheme.

13. The apparatus of claim 8, wherein the instructions are also executable to:
decode the demodulated current data and the demodulated secondary data before canceling the interference.

14. The apparatus of claim 8, wherein the instructions are also executable to:
determine the current channel estimate using pilot data received with the current data; and
determine the secondary channel estimates using pilot data received with the secondary data.

15. An apparatus for canceling interference in a communication system, comprising:
means for receiving a signal that comprises current data from a current access point and secondary data from one or more secondary access points;
means for demodulating the secondary data using one or more secondary channel estimates if a signal metric is less than a predetermined threshold, wherein the signal metric indicates an available fraction of a bandwidth allocated to a mobile device;
means for canceling interference in the received signal using the demodulated secondary data if the signal metric is less than the predetermined threshold; and
means for demodulating the received signal with the interference canceled using a current channel estimate to obtain the current data, wherein the signal metric is one of a number of tiles used to transmit the current data or a number of available tiles in the bandwidth on which the current data was transmitted, wherein the bandwidth is allocated proportional to a communication data rate.

16. The apparatus of claim 15, wherein the predetermined threshold is half of the total number of tiles in the bandwidth on which the current data was transmitted.

17. The apparatus of claim 15, wherein the predetermined threshold is a configurable value.

18. The apparatus of claim 15, wherein the current data is sent from the current access point and the secondary data is sent from the one or more secondary access points using Orthogonal Frequency-Division Multiple Access (OFDMA) or Frequency Division Multiple Access (FDMA).

19. The apparatus of claim 15, wherein the interference cancelation uses at least one of a Minimum Mean Square Error (MMSE) filter, a Linear MMSE filter, a matched filter, a Maximum Ratio Combining (MRC) filter, and a filter based on another Multiple Input Multiple Output (MIMO) demodulation scheme.

20. The apparatus of claim 15, further comprising:
means for decoding the demodulated current data and the demodulated secondary data before canceling the interference.

21. The apparatus of claim 15, further comprising:
means for determining the current channel estimate using pilot data received with the current data; and
means for determining the secondary channel estimates using pilot data received with the secondary data.

22. A non-transitory computer-program product for canceling interference in a communication system, the computer-program product comprising a computer-readable medium having instructions thereon, the instructions comprising:

code for receiving a signal that comprises current data from a current access point and secondary data from one or more secondary access points;

code for demodulating the secondary data using one or more secondary channel estimates if a signal metric is less than a predetermined threshold, wherein the signal metric indicates an available fraction of a bandwidth allocated to a mobile device;

code for canceling interference in the received signal using the demodulated secondary data if the signal metric is less than the predetermined threshold; and code for demodulating the received signal with the interference canceled using a current channel estimate to obtain the current data, wherein the signal metric is one of a number of tiles used to transmit the current data or a number of available tiles in the bandwidth on which the current data was transmitted, wherein the bandwidth is allocated proportional to a communication data rate.

23. The computer-program product of claim 22, wherein the predetermined threshold is half of the total number of tiles in the bandwidth on which the current data was transmitted.

24. The computer-program product of claim 22, wherein the predetermined threshold is a configurable value.

25. The computer-program product of claim 22, wherein the current data is sent from the current access point and the secondary data is sent from the one or more secondary access points using Orthogonal Frequency-Division Multiple Access (OFDMA) or Frequency Division Multiple Access (FDMA).

26. The computer-program product of claim 22, wherein the interference cancelation uses at least one of a Minimum Mean Square Error (MMSE) filter, a Linear MMSE filter, a matched filter, a Maximum Ratio Combining (MRC) filter, and a filter based on another Multiple Input Multiple Output (MIMO) demodulation scheme.

27. The computer-program product of claim 22, further comprising:

code for decoding the demodulated current data and the demodulated secondary data before canceling the interference.

28. The computer-program product of claim 22, further comprising:

code for determining the current channel estimate using pilot data received with the current data; and code for determining the secondary channel estimates using pilot data received with the secondary data.

\* \* \* \* \*